(12) United States Patent
Borkowsky et al.

(10) Patent No.: US 8,846,816 B2
(45) Date of Patent: Sep. 30, 2014

(54) PROCESS AND APPARATUS FOR THE PREPARATION OF CROSSLINKABLE RUBBER MIXTURES

(75) Inventors: Anno Borkowsky, Bensheim (DE); Andreas Schröder, Dossenheim (DE); Hans-Martin Issel, Weinheim (DE); Florian Fischer, Ebersberg (DE); Reinhard Uphus, Hannover (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 630 days.

(21) Appl. No.: 12/492,300

(22) Filed: Jun. 26, 2009

(65) Prior Publication Data

US 2010/0029852 A1    Feb. 4, 2010

Related U.S. Application Data

(60) Provisional application No. 61/083,200, filed on Jul. 24, 2008.

(30) Foreign Application Priority Data

Jul. 3, 2008 (DE) .......................... 10 2008 040 138

(51) Int. Cl.
*C08F 8/34* (2006.01)
*C08J 3/22* (2006.01)

(52) U.S. Cl.
CPC .............. *C08J 3/226* (2013.01); *C08J 2421/00* (2013.01); *C08J 2321/00* (2013.01)
USPC ...................... 525/326.2; 525/194; 525/328.2; 525/328.3; 525/343; 525/349; 525/374; 525/383; 422/134; 422/135; 422/137; 366/83; 366/85

(58) Field of Classification Search
CPC ............ C08L 2666/02; C08L 2666/06; C08L 23/0815; C08F 291/00; C08J 13/005; C08J 13/24
USPC .............. 525/328.3, 343, 349, 374, 383, 326, 525/194; 422/137, 134, 135; 366/83, 85
See application file for complete search history.

(56) References Cited

U.S. PATENT DOCUMENTS

| | | | |
|---|---|---|---|
| 4,897,237 A | 1/1990 | Frey et al. | |
| 5,262,111 A * | 11/1993 | Capelle et al. | ......... 264/211.23 |
| 5,358,693 A * | 10/1994 | Brinkmann et al. | ......... 422/137 |
| 6,359,071 B1 | 3/2002 | Hara et al. | |
| 6,538,066 B2 | 3/2003 | Hara et al. | |
| 6,861,470 B2 | 3/2005 | Hara et al. | |
| 7,275,574 B2 | 10/2007 | Hara et al. | |
| 2004/0140583 A1 | 7/2004 | Uphus | |
| 2006/0199059 A1 | 9/2006 | Xu | |
| 2007/0154778 A1 | 7/2007 | Haufe | |

FOREIGN PATENT DOCUMENTS

| | | |
|---|---|---|
| CH | 536655 | 6/1973 |
| JP | 59175507 * | 10/1984 |
| JP | 2005259513 A1 | 9/2005 |
| KR | 2006016001 * | 2/2006 |
| WO | 03008175 A1 | 1/2003 |
| WO | 2004039872 A1 | 5/2004 |

OTHER PUBLICATIONS

WO Search Report from co-pending Application No. PCT/EP09/058041 dated Sep. 7, 2009, 3 pages.

* cited by examiner

*Primary Examiner* — Ling Choi
*Assistant Examiner* — Chun-Cheng Wang
(74) *Attorney, Agent, or Firm* — Nicanor A. Kohncke

(57) ABSTRACT

The invention relates to a process and an apparatus for the preparation of a crosslinkable rubber mixture for vehicle tires, lines, drive belts and other industrial rubber articles, which can be carried out at least semicontinuously.

The present invention is based on the discovery that the experiments known from the prior art to carry out the batch-wise process usually used at least partly continuously have failed in particular because of the problem that the crosslinking agents have to be mixed rapidly and homogeneously with the base mixture, also referred to as rubber base mixture, without the mixture consisting of the base mixture and the crosslinking agents heating up too strongly. According to the invention, attention was therefore focussed on reliably mixing the base mixture homogeneously with the crosslinking agents and minimizing the mixing time.

A first measure for achieving the desired aim consists in first mixing the crosslinking agents with one another before they are mixed with the base mixture.

The mixture of crosslinking agents is in particular first packed in a container which is used for feeding the crosslinking agents into a base mixture.

12 Claims, No Drawings

PROCESS AND APPARATUS FOR THE PREPARATION OF CROSSLINKABLE RUBBER MIXTURES

The invention relates to a process for the preparation of crosslinkable rubber mixture for vehicle tyres, tubes, profiles, drive belts, which process can be carried out at least semicontinuously, and to an apparatus for carrying out the process. Homogeneous rubber mixtures in the context of the invention comprise polymers and blends thereof which have elastic properties after crosslinking, such as natural rubber (NR), isoprene rubber (IR), styrene-butadiene rubber (SBR), butadiene rubber (BR), isoprene-isobutylene rubber (IIR), polychloroprene rubber (CR), acrylonitrile-butadiene rubber (NBR), hydrogenated acrylonitrile-butadiene rubber (HNBR), carboxylated acrylonitrile-butadiene rubber (XNBR), hydrogenated carboxylated acrylonitrile-butadiene rubber (HXNBR), ethylene-propylene-diene rubber (EPDM), ethylene-propylene rubber (EPM), fluorine rubber (FKM), perfluorinated fluorine rubber (FFKM), acrylate-ethylene rubber (AEM), acrylate rubber (ACM), chlorinated polyethylene, chlorosulphonated polyethylene, ethylene-vinyl acetate rubber (EVA), silicon rubber, fluorosilicone rubber, ethylene-epichlorohydrin rubber (ECO), epichlorohydrin rubber (CO), polyurethane rubber (PU).

Further constituents of the rubber mixtures are in particular white inorganic fillers, such as mica, kaolin, siliceous earth, silicic acid, chalk, talc, carbon fillers, such as carbon black, graphite, carbon nanotubes and/or magnetic fillers, such as iron powder, iron oxides, crosslinking agents, such as sulphur, peroxides, metal oxides, fatty acids, accelerators, such as dithiocarbamates (zinc dimethyldithiocarbamate, such as, for example, PERKACIT ZDMC from Flexsys, zinc diethyldithiocarbamate, or PERKACIT ZDEC from Flexsys, dibutyldithiocarbamate, such as, for example, PERKACIT zinc dibutyldithiocarbamate ZDBC from Flexsys, etc.), thiurams (tetramethylthiuram disulphide (TMTD), tetramethylthiuram monosuiphide (TMTM), tetraethylthiuram disulphide (TETD), bis(pentamethylene)thiuram tetrasulphide DPTT, etc.), thioureas (ethylenethiourea (ETU), N,N,N'N'-tetramethylthiourea (TMTU), diethylthiourea (DETU), dibutylthiourea (DBTU), etc.), mercapto accelerators (2-mercaptobenzothiazole (MBT), mercaptobenzothiazyl disulphide (MBTS), zinc mercaptobenzothiazole (ZMBT), sulphenamide (N'-cyclohexylbenzothiazole-2-sulphenamide (CBS), N-tert-butyl-2-benzothiazolesulphenamide (TBBS), 2-morpholinebenzothiazolesulphenamide (MBS), etc.), thiophosphate and dithiophosphate accelerators, such as zinc O,O-di-n-butyl dithiophosphate (ZBDP), zinc O-butyl-O-hexyl dithiophosphate, zinc O,O-diisooctyl dithiophosphate, such as, for example, the Rhenogran® types ZDT, ZAT, ZBOP from Rhein Chemie Rheinau GmbH, etc. (ZOPD), dodecylammonium diisooctyldithiophosphate (AOPD), and guanidines (diphenylguanidine (DPG), N'N-di-orthotolylguanidine (DOTG), etc.) and/or discolouring and non-discolouring antiageing agents, such as paraphenylenediamines (isopropylphenylparaphenylenediamine (IPPD), paraphenylenediamine (6PPD), N,N-ditoly-p-phenylenediamine (DTPD), etc.), amines (trimethyl-1,2-dihydroquinoline (TMQ), [(phenyl)amine]-1,4-naphthalenedione (PAN), bis(4-octylphenyl)amine (ODPA), styrenated diphenylamine (SDPA), etc.), mono- and bisphenols such as, for example, Vulkanox types 2,2'-methylenebis(4-methyl-6-tert-butylphenol (BPH), 2,2'-isobutylidenebis(4,6-dimethylphenol) (NKF), 2,2'-dicyclopentadienylbis(4-methyl-6-tert-butylphenol) (SKF), 2,2'-methylenebis(4-methyl-6-cyclohexylphenol (ZKF), 2,6-di-tert-butyl-p-kresol (BHT), substituted phenol (DS), styrenated phenols (SPH), mercaptobenzimidazoles (2-mercaptobenzimidazole (MBI), 2-mercaptomethylbenzimidazole (MMBI), zinc 4- and -5-methyl-2-mercaptobenzimidazoles (ZMMBI), etc.) and olefins and/or paraffinic and aromatic plasticizers.

According to prior art, usually a mixer is filled with rubber, fillers, plasticizers and thermally and chemically stabilizing additives in a first step. The material to be mixed is mixed in the mixer. After the end of the mixing process, the mixture thus prepared—referred to below as base mixture—is removed. The base mixture removed is then rolled out and the rolled base mixture is cut in the desired size into lobes or mats. The mixture is either directly further processed or stored prior to further processing. During storage, the mixture hides obtained by rolling and cut into the form of lobes or mats (or another storage form) are covered with release agents and first stacked. Prior to further processing to give the finished component, the base mixture is accelerated. Acceleration is to be understood as meaning that crosslinking agent and accelerator are added in order to be able to crosslink the rubber rapidly. Sulphur would be adequate as a crosslinking agent to enable crosslinking of the rubber to be brought about. However, the crosslinking would then take a very long time, as a rule several days. In order to accelerate the crosslinking, further chemicals or substances are added, also referred to as accelerators, which are capable of accelerating the crosslinking, and in particular by heating the mixture to sufficiently high temperatures, which as a rule are above 120° C., preferably 150° C. However, there are also mixtures which vulcanize or crosslink at room temperature. If the mixture is heated to the corresponding temperatures, the mixture crosslinks in a few minutes. However, the fact that such a mixture consisting of the base mixture and the crosslinking agents is reactive and therefore must not be heated very greatly prior to processing to give the end product is then also problematic. In particular, it is not permitted to exceed temperatures of 120° C., preferably 100° C. Moreover, the temperatures must not exceed as a rule 50° C. in the relatively long term. Otherwise, the mixture crosslinks prematurely and is therefore unusable. For this reason, the base mixture prepared by a batchwise method is as a rule first stored and thus cooled and is mixed with crosslinking agents at a later time.

The proportion of the crosslinking agents, based on the mixture, is usually less than 20 percent by weight.

According to the prior art today, crosslinking agents are mixed with the base mixture with the aid of a two-roll mill, roll mill or internal mixer. The base mixture is fed together with crosslinking agents to a two-roll mill. Individual regions of the mixed material from the roll mill are cut into or cut out after passing the nip which is formed by the two rolls and are fed again to the nip of the two-roll mill in order thus to mix the crosslinking agents with the base mixture. The feeding of the mixed material and the cutting out of the mixed material are carried out manually. The individual crosslinking agents are weighed individually and manually for the feed. The individual crosslinking agents are added separately from one another manually after the respective weighing.

The mixing with the aid of a two-roll mill helps to ensure that the mixture does not heat up excessively, which would lead to premature crosslinking. However, a two-roll mill takes up a relatively large amount of space. The space requirement of the two-roll mill is several square meters. In the mixing room in which this process is carried out, a weighing device must furthermore be present in order to be able to weigh the crosslinking agents. Furthermore, a sufficiently large amount of space must be available so that at least one person can carry out the weighing and the mixing unhindered and safely.

What is problematic in connection with the crosslinking agents is that relatively small amounts of crosslinking agents are metered individually by weighing, which leads to relatively large deviations in the metered amounts. If, for example, five components of 100 grams each are required, weighing errors and human failure can lead to inaccurate metering in five cases. The process is susceptible to errors simply for this reason. Moreover, it is difficult to weigh such small amounts sufficiently accurately. Furthermore, it is easily possible for the crosslinking agents, for example, to become contaminated by light, moisture or foreign bodies, which can mean that the mixture prepared therewith is unusable. The crosslinking agents can be environmentally harmful so that the environment, too, may also be contaminated by the crosslinking agents.

After mixing by means of a two-roll mill, the mixture thus obtained is present in the form of sheets or hides. These sheets or mixture hides are optionally converted into another processing format (e.g. strips) more suitable for further processing. Frequently, the mixtures are temporarily stored again prior to further processing, which is associated in particular with the fact that mixing is effected batchwise. The mixture hides can, however, also be further processed immediately without further intermediate storage.

According to the prior art, quality controls usually take place. For this purpose, a piece, for example of the size of a coin, is cut from a sheet. This coin-size piece is investigated, in particular the crosslinking behaviour. This is affected with the aid of a vulcameter. In addition, parts can be cut from the mixture to be tested and can be crosslinked to give sheets. Tensile test bars (e.g. S2) can be punched out of the sheets thus produced and tensile tests can then be carried out with said tensile test bars.

If the results of the investigations are unsatisfactory, a prepared mixture is not released. The mixture is not further processed and is not sold. In the case of these quality controls, however, there is the problem that it is virtually impossible to obtain a 100% homogenous mixture. For this reason, it is true that a mixture as a whole may meet the quality requirements. However, if the quality control was carried out with a cut-out which does not meet the requirements merely because of a variation, the entire mixture is discarded although as a whole the required quality was reached. The usual quality controls therefore also have the disadvantage of investigating the mixture only in the form of random samples.

These quality controls known from the prior art do not directly determine the homogeneity of the mixture prepared. Instead, various physical properties of the mixture are determined. The homogeneity of the mixture is inferred from the results thus obtained. It would be desirable to be able to determine the homogeneity directly and not on the basis of various pointers, in order thus to be able to carry out quality controls more quickly and reliably.

Furthermore, what is problematic of the prior art is that whether a mixture can be sold is determined at a very late time in the preparation process, namely after the end of the process. The financial losses associated with discarding of a mixture are therefore particularly high.

The disadvantages of the prior art described are therefore the high costs, the high personnel requirement and the susceptibility to faults. Attempts have therefore often been made to carry out the preparation of such rubber mixtures continuously and in this respect to automate said preparation. However, it has not been possible to obtain satisfactory results. For this reason, the batchwise process for the preparation of rubber mixtures which was mentioned at the outset is almost exclusively used in practice, as described, for example, in US 2004140583 A1.

It is true that US 2004140583 A1 proposes the continuous preparation of rubber mixtures by means of a twin-screw extruder to which the rubber is fed with the aid of a gear pump. However, this proposal, too, has not been able to alter the fact that to date rubber mixtures are prepared virtually exclusively batchwise.

German patent 37 29 237 describes a process in which rubber is processed continuously in a twin-screw extruder with fillers, oils, auxiliaries and crosslinking agents to give a rubber mixture. However, U.S. Pat. No. 5,262,111A has already disclosed that this process fails simply because homogenization had to be effected in a tedious manner. It is true that U.S. Pat. No. 5,262,111 A proposes solving these problems by a two-stage addition of carbon black portions and preparing the mixture by means of a twin-screw extruder. Although this teaching has now been known for more than 15 years, this process, too, has proved inadequate in practice.

The publication EP 0 490 056 A1 confirms, in 1991, that rubber mixtures are prepared virtually exclusively in internal mixers and hence batchwise, since the many very special problems associated with the preparation of a rubber mixture could not be solved. It is true that EP 0 490 056 A1 proposes cooling a twin-screw extruder in which mixing is effected, in order thus to avoid vulcanization or crosslinking of the mixture after addition of crosslinking agents. However, it is not possible to cool the interior of a twin-screw extruder sufficiently since cooling is possible only from the outside. This proposal, too, therefore could not alter the situation that in practice preparation is still effected batchwise.

There are numerous further proposals and experiments for preparing rubber mixtures continuously. Nevertheless, the producers of such rubber mixtures still feel forced in practice to effect preparation batchwise in the manner described at the outset.

It is an object of the present invention to provide a practicable process which is more efficient than the known batchwise process.

The present invention is based on the discovery that the experiments known from the prior art to carry out the batchwise process mentioned at the outset continuously have failed in particular because of the problem that the crosslinking agents have to be mixed rapidly and homogeneously with the base mixture, also referred to as rubber base mixture, without partial crosslinking taking place owing to excessively high temperatures (T>120° C., preferably 100° C.) of the material to be mixed which consists of the base mixture and crosslinking agents. According to the invention, attention was therefore focussed on reliably mixing the base mixture with the crosslinking agents homogeneously and continuously and minimizing the duration of mixing.

The present invention therefore relates to a novel process for the preparation of a crosslinkable rubber mixture, in which crosslinking agents for the crosslinking are mixed with one another and the crosslinking agents mixed with one another are then mixed with a base mixture which contains rubber.

A first measure for achieving the desired aim consists in first mixing the crosslinking agents with one another before these are mixed with the base mixture. Crosslinking agents can be easily mixed with one another at low temperatures (T≤100° C.), so that no reaction of the crosslinking chemicals takes place during the mixing. A very homogeneous mixture of the crosslinking agents can therefore be prepared without problems. Moreover, the mixing of the base mixture with the crosslinking agents is accelerated by this measure since the crosslinking agents have already been homogeneously mixed with one another. Since the crosslinking agents have already been homogeneously mixed with one another, homogeneous distribution of the crosslinking agents in the base mixture is therefore also ensured in an improved manner. Overall, it is therefore possible to reduce the danger that the desired continuous preparation fails in practice as a result of the mixing of the base mixture with the crosslinking agent.

Crosslinkable rubber mixtures in the context of the invention comprise polymers and blends thereof which have elastic properties after crosslinking, such as natural rubber (NR), isoprene rubber (IR), styrene-butadiene rubber (SBR), butadiene rubber (BR), isoprene-isobutylene rubber (IIR), polychloroprene rubber (CR), acrylonitrile-butadiene rubber (NBR), hydrogenated acrylonitrile-butadiene rubber (HNBR), carboxylated acrylonitrile-butadiene rubber (XNBR), hydrogenated carboxylated acrylonitrile-butadiene rubber (HXNBR), ethylene-propylene-diene rubber (EPDM), ethylene-propylene rubber (EPM), fluorine rubber (FKM), perfluorinated fluorine rubber (FFKM), acrylate-ethylene rubber (AEM), acrylate rubber (ACM), chlorinated polyethylene, chlorosulphonated polyethylene, ethylene-vinyl acetate rubber (EVA), silicone rubber, fluorosilicone rubber, ethylene-epichlorohydrin rubber (ECO), epichlorohydrin rubber (CO), polyurethane rubber (PU).

In a further embodiment of the process according to the invention, the crosslinking agents mixed with one another contain zinc oxide, benzothiazyl-2-cyclohexylsulphenamide (CBS) and/or mercaptobenzothiazyl disulphide (MBTS).

In principle, crosslinking agent mixtures according to the invention comprise crosslinking agents such as sulphur, peroxides, metal oxides, fatty acids, accelerators, such as dithiocarbamates, such as zinc dimethyldithiocarbamate, such as, for example, PERKACIT ZDMC from Flexsys, zinc diethyldithiocarbamate, such as PERKACIT ZDEC from Flexsys, dibutyldithiocarbamate, such as PERKACIT zinc dibutyldithiocarbamate ZDBC from Flexsys, etc., thiurams, such as, for example, tetramethylthiuram disulphide (TMTD), tetramethylthiuram monosuiphide (TMTM), tetraethylthiuram disulphide (TETD), bis(pentamethylene)thiuram tetrasulphides (DPTT), thioureas, such as, for example, ethylenethiourea (ETU), N,N,N'N'-tetramethylthiourea (TMTU), diethylthiourea (DETU), dibutylthiourea (DBTU), etc.), mercapto accelerators, such as, for example, 2-mercaptobenzothiazole (MBT), mercaptobenzothiazyl disulphide (MBTS), zinc mercaptobenzothiazole (ZMBT), sulphenamides (N'-cyclohexylbenzothiazole-2-sulphenamide (CBS), N-tert-butyl-2-benzothiazolesulphenamide (TBBS), 2-morpholinebenzothiazolesulphenamide (MBS), etc.), dithiophosphates, thiophosphate and dithiophosphate accelerators, such as zinc O,O-di-n-butyl-dithiophosphate (ZBDP), zinc O-butyl-O-hexyl dithiophosphate, zinc O,O-diisooctyl dithiophosphate (ZOPD), dodecylammonium diisooctyl dithiophosphate (AOPD), such as, for example, the Rhenogran® types ZDT, ZAT, ZBOP from Rhein Chemie Rheinau GmbH, etc.), guanidines, such as, for example, diphenylguanidine (DPG) and/or N'N-di-ortho-tolyl guanidines (DOTG), etc.), discolouring and non-discolouring antiageing agents, such as paraphenylenediamines isopropylphenylparaphenylenediamine (IPPD), paraphenylenediamine (6PPD), N,N-ditoly-p-phenylenediamine (DTPD), etc., amines (trimethyl-1,2-dihydroquinoline (TMQ), [(phenyl)amine]-1,4-naphthalenedione (PAN), bis(4-octylphenyl) amine (ODPA), styrenated diphenylamine (SDPA), etc.), mono- and bisphenols, such as, for example, 2,2'-methylenebis(4-methyl-6-tert-butylphenol) (BPH), 2,2'-isobutylidenebis(4,6-dimethylphenol) (NKF), 2,2'-dicyclopentadienylbis(4-methyl-6-tert-butylphenol) (SKF), 2,2'-methylenebis(4-methyl-6-cyclohexylphenol) (ZKF), 2,6-di-tert-butyl-p-kresol (BHT), substituted phenol (DS), styrenated phenols (SPH), mercaptobenzimidazoles, such as, for example, 2-mercaptobenzimidazole (MBI), 2-mercaptomethylbenzimidazole (MMBI), zinc 4- and 5-methyl-2-mercaptobenzimidazole (ZMMBI), etc.), olefins, paraffinic and/or aromatic plasticizers. The composition is tailored to the desired end product.

Typical components of a mixture according to the invention which consists of crosslinking agents are zinc oxide, sulphur, CBS (cyclohexylbenzothiazylsulphenamide) and MBTS (methylbenzothiazyl disulphide) and EPDM, EVA, plasticizer, etc. as rubber binder. The melting point of sulphur is about 115° C., the melting point of CBS is about 140° C. and the melting point of MBTS is about 180° C.

In a preferred embodiment of the process according to the invention, mixtures of crosslinking agents are used in which the crosslinking agents mixed with one another melt at temperatures below 100° C., temperatures which are above this melting point and below 150° C., preferably below 100° C., being produced during the mixing with the base mixture.

It was found that, as a result of the mixing, the components sulphur, CBS and MBTS can melt at about 90° C. Owing to the mixing, a melting point depression which is usually less than 120° C., preferably 100° C., is generally achieved. In an advantageous configuration of the process, the basic mixture is therefore mixed with the crosslinking agents so that the resulting temperature is above the melting point of the mixture and below the temperature above which there is a danger of the mixture crosslinking through the mixing and the temperatures resulting thereby. Suitable temperatures are usually between 90 and 120° C., preferably between 90 and 100° C. If the crosslinking agents melt during the mixing with the base mixture, the aim of distributing the crosslinking agents rapidly and homogeneously in the base mixture in order thus to be able to carry out at least the mixing of the base mixture with the crosslinking agents in an automated manner can be achieved in an improved manner thereby. If mixing is effected sufficiently rapidly, temperatures above 50° C. are not problematic.

In a preferred embodiment of the process according to the invention, the base mixture is cooled before it is mixed with the crosslinking agents, in particular to less than 120° C., preferably less than 100° C., in particular preferably less than 50° C.

In an embodiment of the invention, the crosslinking agents are coated with polymers before the mixing with the base mixture. Particularly suitable polymers are those which have a surface tension and/or a polarity comparable with those of the base mixture. Because matching of the surface tensions and/or polarities is thus achieved, it is possible for the material to be mixed and consisting of the base mixture and the crosslinking agents to be mixed more reliably and hence more homogeneously and more rapidly with one another.

In a preferred embodiment of the process according to the invention, the crosslinking agents are therefore coated with a mixture of polymers for the crosslinking, and the crosslinking agents coated with polymers are mixed with a base mixture which contains rubber.

Advantageously, the polymers are selected so that melting points, crystallinity and/or surface structures of the polymers and of the base mixture are similar in order thus to improve the mixing, i.e. in order rapidly to obtain a homogeneous result of the mixing. Suitable polymers are in particular natural rubber (NR), isoprene rubber (IR), styrene-butadiene rubber (SBR), butadiene rubber (BR), isoprene-isobutylene rubber (IIR), polychloroprene rubber (CR), acrylonitrile-butadiene rubber (NBR), hydrogenated acrylonitrile-butadiene rubber (HNBR), carboxylated acrylonitrile-butadiene rubber (XNBR), hydrogenated carboxylated acrylonitrile-butadiene rubber (HXNBR), ethylene-propylene-diene rubber (EPDM), ethylene-propylene rubber (EPM), fluorine rubber (FKM), perfluorinated fluorine rubber (FFKM), acrylate-ethylene rubber (AEM), acrylate rubber (ACM), chlorinated polyethylene, chlorosulphonated polyethylene, ethylene-vinyl acetate rubber (EVA), silicone rubber, fluorosilicone rubber, ethylene-epichlorohydrin rubber (ECO), epichlorohydrin rubber (CO), polyurethane rubber (PU).

In an embodiment of the invention, the crosslinking agents are first mixed. The crosslinking agents mixed with one another are then mixed with one or more polymeric binders in a mixing unit (for example a kneader, roll mill, extruder, etc.). The temperature is controlled during this procedure so that no crosslinking of the polymers used in each case takes place.

In a preferred embodiment of the process according to the invention, the base mixture is prepared batchwise.

In an embodiment of the invention, the crosslinking agents are introduced at high pressure into the base mixture, which in particular is transported without pressure in comparison. A high pressure in the context of the present invention is in particular several 10 bar, preferably at least 50 bar, particularly preferably at least 100 bar. This ensures that, simply because of the high feed pressure, crosslinking agents are immediately distributed in the basic mixture by turbulence, which helps to ensure that a homogeneous mixture is prepared rapidly.

In a preferred embodiment of the invention, the crosslinking agents for the crosslinking of a mixture are pumped at a high pressure of preferably at least 50 bar into a base mixture which contains rubber, and the base mixture is then mixed with the crosslinking agents in a mixing apparatus.

Preferably, the base mixture is transported in an extruder having preferably only one shaft, while the crosslinking agents are pumped at high pressure into the base mixture. Owing to the great pressure difference, turbulence occurs. Further mixing with the aid of the extruder can be shortened accordingly.

In an embodiment of the invention, the crosslinking agents are pumped by means of a gear pump into the base mixture. With the aid of a gear pump, firstly the desired high pressure can be generated and secondly feed can be effected by suitable metering.

In a further embodiment of the invention, the crosslinking agents mixed with one another are introduced into a container, the container is closed, the closed container is connected to an apparatus for mixing the base mixture with the crosslinking agents and is opened, the crosslinking agents are fed from the container to the base mixture, and the crosslinking agents fed in are mixed with the base mixture.

In an embodiment of the invention, the crosslinking agents are present in an initially closed container which is connected to a metering and feed apparatus and is opened in a suitable manner in order to transport the crosslinking agents in the direction of the base mixture. If the crosslinking agents have already been mixed, it is possible without problems for this mixture first to be stored in a container and then to be fed with metering with the aid of a metering and feed apparatus, for example with a gear pump, to the base mixture. By means of this embodiment, contamination of the mixture is avoided. Furthermore, the environment is protected from contamination by the crosslinking agents. Since the mixing and subsequent packing of the crosslinking agents can be carried out industrially together with carrying out of quality controls, the errors mentioned at the outset, which can occur as a result of manual weighing of the individual components, are avoided or at least minimized.

In order to ensure continuous mixing of the basic mixture with the crosslinking agents, the container is provided with a detector by means of which the level or the degree of emptying is determined. This information can be used for preparing the exchange of the container in good time in order thus to ensure the continuous mixing of the base mixture with the crosslinking agents.

It is therefore preferable to monitor the level of the container during the feed by means of a detector.

In an embodiment of the invention, the abovementioned detector is provided with means which prevent further emptying of the container as a function of the detector signal. It is thus possible to avoid the occurrence of metering errors due to residual amounts which are too small.

In an embodiment of the invention, the containers are provided with electronic memory means, such as an RFID chip (Radio Frequency IDentification) with which information about the content of the container can be electronically stored and read out. Manufacturing errors can thus be further avoided, for example by providing corresponding reading and monitoring apparatuses which read out and monitor the information during the feeding of the crosslinking agents. Thus, for example, it is possible to monitor whether an expiry date has been exceeded or whether the desired content is present in the container. Production errors can thus be avoided. If information which indicates that there is an increased risk of production errors occurring is read out, the feeding crosslinking agents is automatically prevented in an embodiment of the invention.

An RFID chip has the advantage of enabling operation without energy supply and wireless read-out. However, it is also possible to use other memory elements such as, for example, flash memory elements, which are read out via a cable connection. The container is then provided, for example, with a plug to which a cable has to be connected in order to permit reading out of information.

The memory element may also contain information about the respective level in the container, which information was obtained, for example, by said detector. Thus, in the case of a plurality of exchanges, it is possible to avoid accidentally choosing containers which have been emptied to an excessive extent.

In the process according to the invention, it is possible and also preferable for the container to be closed as a function of the detector signal.

Furthermore, it is possible and also preferred in the process according to the invention for the container also to contain means for electronic storage of data and for information about the content of the container thus to be electronically stored and the data to be read out and monitored before feeding of the crosslinking agents to the base mixture.

In a configuration of the process, the same base mixture is always used. Product change is effected simply by changing the crosslinking agents. Product change can now be carried out very rapidly and reliably especially when the crosslinking agents or mixtures of crosslinking agents are present packed in containers. Simply by exchanging the container, the product change can then be carried out. Prior emptying and cleaning of containers is not required.

Where product changes are carried out during the process according to the invention, this is possible in a simple manner by exchanging only the container with crosslinking agents for this purpose and thus preparing another product.

In the process according to the invention, the crosslinking agents can be mixed continuously with the base mixture, which represents a preferred embodiment.

In the process according to the invention, it is also possible for the crosslinking agents to be provided with marking substances whose distribution is checked continuously while the process is being carried out.

In this case, the proportion of the marking substances is preferably less than 50% by weight, preferably less than 5% by weight, particularly preferably less than 1% by weight, based on the crosslinking agents mixed with one another.

The present invention also relates to a container for carrying out the process according to the invention.

In a preferred embodiment of the invention, the container for carrying out the process according to the invention contains crosslinking agents mixed with one another and intended for crosslinking a mixture comprising rubber and is closed.

The crosslinking agents mixed with one another preferably have the meaning described in the case of the process according to the invention. This means that they are, for example, a mixture of sulphur, zinc oxide, CBS and/or MBTS or can also be coated with at least one polymer.

Typical container volumes are chosen so that mixtures having a weight of in particular 100 kg to several tones can be held. The volume is then 100 l to several 1000 l or even 10 000 liters.

In a particular embodiment, the content of the container according to the invention is at least 100 kg.

The containers typically consist of a metal, in particular of aluminium or steel.

A container is preferably designed so that it comprises a closable lid by which the container can be filled. The lid is preferably sufficiently large so that a person can climb into a container, in order, for example, to carry out cleaning work.

In a preferred embodiment of the invention, the container is preferably provided with a detector by means of which the amount of content in the container can be determined.

Furthermore, it is preferable if the container according to the invention is equipped with means for automatic closing of the container as a function of the signal of the detector.

It is likewise preferable if it is provided with an RFID chip in which information about the contents of the container is stored.

Furthermore, it is preferable if the marking substances which are present in the container according to the invention and in particular can reflect light, can be excited by UV light, with which it is possible to carry out the NMR relaxation investigations, which are magnetic, which are capable of absorbing light very much more strongly in comparison with the crosslinking agents, which have a density differing considerably in comparison with the base mixture and/or which have a substantially different electrical conductivity in comparison with the crosslinking agents.

With the aid of the containers, it is possible to meet the safety requirements which in some cases are statutory. Thus, for example crosslinking agents are reliably protected from fires.

In an embodiment of the invention, marking substances, for example substances for establishing electrical conductivity, reflective substances, magnetic substances, substances which can be excited by UV light, substances with which NMR relaxation investigations can be carried out, which have a density differing considerably in comparison with the base mixture, etc., are also added to the mixture consisting of the crosslinking agents. For carrying out quality controls and content checks, the added substances are detected. Thus, in an embodiment of the invention, the distribution of the marking substances is determined, for example the distribution of magnetic particles with the aid of magnetic coils or the distribution of reflective particles on the basis of light reflections or the distribution of particles having a high density on the basis of ultrasound measurements. It is thus possible to monitor whether the marking substances are uniformly distributed in the respective mixtures. In this way, the homogeneity of a mixture can be monitored online, in particular completely, continuously and not merely by means of random samples.

In particular, marking substances which can reflect light or can be excited by UV light, with which NMR relaxation investigations can be carried out, which are magnetic, which are capable of absorbing light considerably more strongly in comparison with the crosslinking agents, which have a density differing considerably in comparison with the base mixture and/or which have considerably different electrical conductivity in comparison with the crosslinking agents are provided. The differences in comparison with the crosslinking agents are considerable when they are so large that, as a result of these differences, the distribution of the marking substances in the mixture can be monitored continuously.

The proportion of the marking substances, based on the crosslinking agents, is very small since they have only the function that their distribution can be checked, and the end products should not be adversely affected by these marking substances. In an embodiment, the proportion in the container is therefore less than 50% by weight of the content of a container, preferably less than 5% by weight, particularly preferably less than 1% by weight, very particularly preferably less than 0.5% by weight.

In an embodiment of the invention, the base mixture is first cooled, in particular to less than 50° C., preferably to less than 30° C., before it is mixed with the crosslinking agents. This increases the mixing energy which can be supplied during the mixing of the crosslinking agents with the base mixture. Thus, rapid mixing can be effected in an improved manner and a homogeneous mixture can be prepared.

It is true that the base mixture can be prepared in a manner known from the prior art. However, it has been found that a result of satisfactory quality can be obtained in particular when the base mixture is still prepared batchwise. This is not a considerable disadvantage particularly when the base mixture is to be initially cooled.

The proportion of the crosslinking agents, based on the mixture, is usually less than 20 percent by weight.

The present invention also relates to the use of the containers according to the invention for protected transport and storage, for adaptation to the mixing unit, for easy changing of the crosslinking mixtures and/or for simple metering of the crosslinking mixture.

The mixing process described can be used for production of various industrial rubber articles, in particular for extrusion applications, such as profiles, tubes, etc. This continuous mixing process is moreover very expedient for mixtures with a high throughput, such as, for example, tyre tread mixtures.

The following examples serve for illustrating the invention without having a limiting effect.

WORKING EXAMPLES

Phr Corresponds Here to "Per Hundred Parts of Rubber"

Working Example 1

A base mixture consisting of 100 phr of natural rubber (Standard Malaysian Rubber SMR 10) and 55 phr of carbon black N550, 5 phr of a plasticizer (mineral oil Vivatec 500) and 1 phr of stearic acid was continuously extruded by means of a single-screw extruder having a gear pump. The temperature of the mixture at the extruder head was about 100° C. The throughput was 44 kg/h. A crosslinker mixture consisting of 43% of zinc oxide ZnO, 18.5% of the accelerator CBS, 18.5% of sulphur S and a binder material (19%) comprising EPDM with a marker substance (cotton fibre) and a marker substance fluorescing in UV light (1% of cotton fibres) was metered to the base mixture by means of a metering apparatus consisting of a gear pump and a conveyor screw. The pressure of the metering apparatus was about 80 bar and the delivery about 2 kg/h. The continuous metering thus corresponds to the addition of 8.125 phr of the crosslinker mixture to the base mixture. After a preliminary phase of about 15 min, about 1 m long extruder strips were drawn as a sample after time intervals of 2 min. From these extruder strips, 5 samples were taken to determine vulcanization curves at 150° C. (by means of RPA 2000, frequency 1 Hz, 1% elongation amplitude) at different points. In addition, further material was taken from the extruder strips after 2 min in order to produce 2 mm sheets therefrom for tensile tests according to DIN 53 504 (vulcanization of the sheets at 160° C. for 10 min in a vulcanization press).

For assessing the homogeneity, the difference between the maximum complex torque S*max and the minimum complex torque S*min (by means of RPA 2000, frequency 1 Hz, 1% elongation amplitude) of the vulcanization curves in Table 1 was used. The standard deviation of the values S*max−S*min from the vulcanization curves is low (<1%) in the case of all five samples of the respective extruder strips after x min of sampling. The standard deviation of the vulcanization curves of the samples of different extruder strips is likewise low (<1%). The mean value of all samples is 2.18 Nm with a standard deviation of 0.61%.

These measured values thus demonstrate the excellent distribution of the crosslinking chemicals in the rubber mixture.

The values (stress values, tensile strength, elongation at break) of the 10 tensile tests for sample 2 (sampling after 2 minutes) are shown in Table 2. The standard deviation of the values of 10 tensile tests of an extruder strip is low (<5%).

For comparison, the polymer-bound crosslinking chemicals (8.125 phr) were introduced with a laboratory roll mill into the NR base mixture (161 phr) using a conventional batchwise mixing process. A very homogeneous mixture (incorporation time >5 min) and a fairly heterogeneous mixture (incorporation time about 1 min) were produced. 2 mm sheets were produced from these mixtures as described above and in each case 10 tensile tests were carried out. The mean values of these measurements (stress values, tensile strength, elongation at break) of the tensile tests of these mixtures are likewise shown in Table 2. It is found here that the mixture with the short incorporation time has a high standard deviation (>>10%) of the values for the tension value, the tensile strength and the elongation at break, while the standard deviation of the stress-strain curves with a long incorporation time is low (<5%).

This shows that mixtures having a homogeneous distribution of the crosslinking chemicals can be prepared by means of the novel mixing process for the crosslinking agents. The homogeneity of the crosslinkable rubber mixtures results in a very low standard deviation (<1%) of the measured values (S*max−S*min) from the vulcanization curves. This homogeneity is also reflected in the low standard deviation of the values of the tensile tests (<5%), which homogeneity is comparable with homogeneity of the mixture prepared by conventional batchwise standard roll milling processes (long incorporation time).

The marker substance fluorescing in UV light (cotton fibre) can be detected with an optical microscope in UV light. Fibres <<500 μm are detectable, which shows the homogeneous distribution in the samples.

TABLE 1

| | Sampling after x[min] | | | | | |
|---|---|---|---|---|---|---|
| Sample No. | 0 | 2 | 4 | 6 | 8 | 10 |
| S*max-S*min as mean value of 5 samples [dNm] | 2.21 | 2.23 | 2.11 | 2.13 | 2.17 | 2.25 |
| Standard deviation | 0.79% | 0.30% | 0.72% | 0.78% | 0.56% | 0.52% |

TABLE 2

| Sample No. | Tension value [MPa] | Standard deviation Tension value | Tensile strength [MPa] | Standard deviation Tensile strength | Elongation at break [%] | Standard deviation Elongation at break |
|---|---|---|---|---|---|---|
| According to the invention Sample 2 | 1.31 | 4.67% | 24.91 | 2.82% | 496 | 2.58% |
| Comparison Laboratory roll | 1.37 | 3.96% | 24.05 | 2.65% | 481 | 2.76% |

The measured values are the mean values of 10 individual measurements.

Working Example 2

The base mixture consisting of 100 phr of natural rubber (Standard Malaysian Rubber SMR 10) and 55 phr of carbon black N550, 5 phr of a plasticizer (Vivatec 500) and 1 phr of stearic acid was extruded according to Working Example 1 in a single-screw extruder. In a first experiment, 7.5 phr of powder chemicals consisting of 48% of zinc oxide ZnO, 20.5% of mercaptobenzothiazyl disulphide (MBTS), 11% of a zinc dithiophosphate (of the type Rhenocure® ZBOP/S from Rhein Chemie Rheinau GmbH) and 20.5% of sulphur S were added without pressure by means of a powder metering apparatus to this mixture (Experiment A, comparative experiment). In a second Experiment B (according to the invention), a polymer-bound batch of chemicals, consisting of 20% of a polymeric EPDM-binder, 5% of a luminescent marker (dialuminium-x-dysprosium-y-europium-(1-x-y)-strontium tetroxide) and 48% of zinc oxide ZnO, 20.5% of mercaptobenzothiazyl disulphide MBTS, 11% of a zinc dithiophosphate (trade name Rhenocure® ZBOP/S from Rhein Chemie Rheinau GmbH) and 20.5% of sulphur S, was prepared. This is the premixed crosslinker mixture according to the invention (batch of chemicals). This is then metered into the rubber mixture at a pressure of about 100 bar. The batch of chemicals was prepared in an internal mixer (1.5 l chamber volume) in a conventional standard mixing process (70% degree of filling, 50 rpm, 50° C., mixing time 5 minutes). The temperature of the mixture after emerging from the single-screw extruder was about 100° C. in both cases.

Two extruder strips thus obtained from Experiments A and B were compared optically with one another. It is found that a major part of the crosslinking chemicals was uniformly distributed but not sufficiently dispersed in the extruder strip of Experiment A (comparative experiment, metering of the powder mixture without pressure). An unacceptable number of white specks are present, while such specks are not found in the tread from Experiment B according to the process according to the invention with the predispersed batch of chemicals.

For further determination of the homogeneity of the mixture, ten different samples were taken about 10 min after the start of the experiment for Experiment A and Experiment B (and measured in a vulcameter from α-Technologies at 160° C.). In both experiments, only a small standard deviation of the values S*max–S*min of <1% is found, which indicates a homogeneous distribution. In Experiment A, however, the vulcanization level is with S*max=1.3 Nm substantially lower than in Experiment B with S*max=1.5 Nm.

The powder chemicals from Experiment A are homogeneously distributed but not sufficiently dispersed, so that the crosslinking density is reduced, in contrast to the polymer-bound predispersed batch of chemicals according to the invention.

The difference is also found in the stress-strain curves of the vulcanizates (vulcanization at 160° C. in the vulcanization press for 10 min). The tension values, for example at 100% elongation, are significantly lower in the case of the NR vulcanizates from Experiment A than those of the NR vulcanizates from Experiment B. In addition, in spite of the higher tension values of the NR vulcanizates from Experiment B, higher values for the elongation at break and the tensile strength are also obtained. In Experiment A, the mean tensile strength is about 15 MPa and the mean elongation at break about 400%, while the mean tensile strength of the vulcanizates from Experiment B is 22 MPa and the mean elongation at break 490%. In addition, the standard deviation of the values from Experiment B is substantially lower than that from Experiment A.

The marker substance luminescent in UV light (dialuminium-x-dysprosium-y-europium-(1-x-y)-strontium tetroxide) can be detected with an optical microscope in UV light. Particles <100 μm are detectable, which shows the homogeneous distribution in the samples.

What is claimed is:

1. A process for the preparation of a crosslinkable rubber mixture, comprising: mixing a first crosslinking agent with a second crosslinking agent, wherein the first crosslinking agent and the second crosslinking agent are coated with a polymer; thereby forming a homogenous mixture of crosslinking agents, whereby a melting point depression of less than 120° C. is achieved for the mixture of crosslinking agents, and continuously admixing the homogenous mixture of crosslinking agents with a discontinuously produced base mixture, said base mixture comprising at least one rubber.

2. The process according to claim 1, wherein the first crosslinking agent and the second crosslinking agent each melt at a temperature of below 100° C. and wherein the step of admixing the mixture of crosslinking agents with the base mixture is performed at a temperature of between 100° C. and 150° C.

3. The process according to claim 1, wherein prior to the step of admixing the homogenous mixture of crosslinking agents with the base mixture, the mixture of crosslinking agents is pumped at high pressure into contact with the base mixture.

4. The process according to claim 1, further comprising:
placing, prior to the step of admixing the mixture of crosslinking agents with a base mixture, the mixture of crosslinking agents into a container,
thereafter closing the container, thereby providing a closed container,
connecting the closed container to an apparatus capable of admixing the base mixture with the crosslinking agents,
opening the closed container, and
transferring the mixture of crosslinking agents to the apparatus capable of admixing the crosslinking agents with the base mixture.

5. The process according to claim 1, wherein the first crosslinking agent and the second crosslinking agent mixture contains an element or compound selected from the group consisting of sulphur, a peroxide, a metal oxide, a fatty acid, a dithiocarbamate, tetramethylthiuram disulphide, tetramethylthiuram monosulphide, tetraethylthiuram disulphide, bis (pentamethylene)thiuram tetrasulphide, ethylenethiourea, N,N,N'N'-tetramethylthiourea, diethylthiourea, dibutylthiourea, 2-mercaptobenzothiazole, mercaptobenzothiazyl, zinc mercaptobenzothiazole, N'-cyclohexylbenzothiazole-2-sulphenamide, N-tert-butyl-2-benzothiazolesulphenamide, 2-morpholinebenzothiazolesulphenamide, dithiophosphates, diphenylguanidine, N'N-di-ortho-tolylguanidine, a discolouring anti-ageing agent, a non-discolouring anti-ageing agent, a paraphenylenediamine, isopropylphenylparaphenylenediamine, paraphenylenediamine, N,N-ditoly-p-phenylenediamine, trimethyl-1,2-dihydroquinoline, [(phenyl) amine]-1,4-naphthalenedione, bis(4-octylphenyl)amine, styrenated diphenylamine, mono-bisphenol, bisphenol, mercaptobenzimidazole, 2-mercaptobenzimidazole, 2-mercaptomethyl-benzimidazoles, zinc 4-methyl-2-mercaptobenzimidazole, zinc 5-methyl-2-mercaptobenzimidazole, an olefin, a paraffinic plasticizer, an aromatic plasticizer, and mixtures thereof.

6. The process according to claim 1, further comprising:
marking the first crosslinking agent and the second crosslinking agent with a marking substance, and
monitoring the distribution of the first crosslinking agent and the second crosslinking agent continuously while the remaining steps are performed.

7. The process according to claim 6, wherein the proportion of the marking substance present is less than 50% by weight based on the total amount of the first crosslinking agent and second crosslinking agent used.

8. The process according to claim 1, wherein the first crosslinking agent and the second crosslinking agent each melt at a temperature of below 100° C. and wherein the step of admixing the mixture of crosslinking agents with the base mixture is performed at a temperature of below 120° C.

9. The process according to claim 3, wherein said high pressure is at least 50 bar.

10. The process according to claim 6, wherein the proportion of the marking substance present is less than 5% by weight based on the total amount of the first crosslinking agent and second crosslinking agent used.

11. A process for the preparation of a crosslinkable rubber mixture, comprising:

mixing a first crosslinking agent with a second crosslinking agent, thereby forming a homogenous mixture of crosslinking agents, whereby a melting point depression of less than 120° C. is achieved for the mixture of crosslinking agents, and admixing the homogenous mixture of crosslinking agents with a discontinuously produced base mixture, said base mixture comprising at least one rubber, wherein, the first crosslinking agent and the second crosslinking agent are marked with a marking substance, and monitoring the distribution of the first crosslinking agent and the second crosslinking agent continuously while the remaining steps are performed.

12. The process according to claim 11, wherein the proportion of the marking substance present is less than 50% by weight based on the total amount of the first crosslinking agent and second crosslinking agent used.

\* \* \* \* \*